United States Patent
Finlow-Bates et al.

(10) Patent No.: US 9,794,025 B2
(45) Date of Patent: Oct. 17, 2017

(54) SYSTEMS AND METHODS FOR COMMUNICATION AND VERIFICATION OF DATA BLOCKS

(71) Applicant: QUALCOMM Incorporated, San Diego, CA (US)

(72) Inventors: Keir Finlow-Bates, Kangasala (FI); Joonas Viskari, Lempaala (FI)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 14/979,223

(22) Filed: Dec. 22, 2015

(65) Prior Publication Data
US 2017/0180076 A1   Jun. 22, 2017

(51) Int. Cl.
G06F 7/02       (2006.01)
H04L 1/14       (2006.01)
H04L 1/00       (2006.01)

(52) U.S. Cl.
CPC .......... *H04L 1/0041* (2013.01); *H04L 1/0045* (2013.01); *H04L 1/0061* (2013.01)

(58) Field of Classification Search
None
See application file for complete search history.

(56) References Cited

U.S. PATENT DOCUMENTS

| | | | |
|---|---|---|---|
| 5,933,571 A * | 8/1999 | Bannai | H04N 5/9264 375/E7.189 |
| 7,016,850 B1 * | 3/2006 | Cox | G10L 21/04 379/88.07 |
| 7,353,146 B2 | 4/2008 | Zarrinkoub et al. | |
| 8,589,688 B2 | 11/2013 | Minematsu | |
| 8,775,562 B2 | 7/2014 | Chavez et al. | |
| 8,832,466 B1 | 9/2014 | McGregor, Jr. et al. | |
| 2005/0190762 A1 * | 9/2005 | Kobayashi | H03M 13/3761 370/389 |
| 2008/0222494 A1 * | 9/2008 | Gondo | H04L 1/0045 714/776 |
| 2009/0172495 A1 * | 7/2009 | Wang | H03M 13/2957 714/755 |
| 2009/0175210 A1 * | 7/2009 | Vijayan | H04L 1/0065 370/312 |

(Continued)

FOREIGN PATENT DOCUMENTS

WO   03045000 A1   5/2003

OTHER PUBLICATIONS

International Search Report and Written Opinion—PCT/US2016/059988—ISA/EPO—Feb. 23, 2017—12 pgs.

*Primary Examiner* — Daniel McMahon
(74) *Attorney, Agent, or Firm* — Hunter Clark PLLC

(57) ABSTRACT

Disclosed are methods, systems, devices, apparatuses, computer-/processor-readable media, and other implementations for data communication in which data is divided into multiple data blocks, with each of the multiple data blocks including a portion of a respective at least one other of the multiple data blocks to produce multiple corresponding resultant data blocks. Additionally, at least one validation code is generated based on the multiple corresponding resultant data blocks. At least the multiple corresponding resultant data blocks and the at least one validation code are communicated to a remote device.

28 Claims, 7 Drawing Sheets

(56) References Cited

U.S. PATENT DOCUMENTS

| | | | |
|---|---|---|---|
| 2011/0080874 A1* | 4/2011 | Robinson | H04L 47/10 370/328 |
| 2014/0019822 A1* | 1/2014 | Esumi | H03M 13/2906 714/755 |
| 2015/0033038 A1 | 1/2015 | Goss et al. | |

* cited by examiner

SYSTEMS AND METHODS FOR COMMUNICATION AND VERIFICATION OF DATA BLOCKS

BACKGROUND

Various file transfer systems, including peer-to-peer file transfer systems, implement data transfer operations that include, for example, splitting (partitioning) files/records up into blocks, and transferring them from the same source, or from different sources, to a common destination. Generally, a determination that the correct file was received and that none of the blocks have been corrupted or replaced is performed at the destination. File transfer systems and processes may use CRC's, hash lists, and/or Merkle trees to implement checks and verifications that the blocks are valid.

SUMMARY

In some variations, a method for data communication is provided, that includes dividing data into multiple data blocks, including, for each of the multiple data blocks, a portion of a respective at least one other of the multiple data blocks to produce multiple corresponding resultant data blocks, generating at least one validation code based on the multiple corresponding resultant data blocks, and communicating to a remote device at least the multiple corresponding resultant data blocks and the at least one validation code.

In some variations, a computing device is provided that includes one or more processors configured to divide data into multiple data blocks, include, for each of the multiple data blocks, a portion of a respective at least one other of the multiple data blocks to produce multiple corresponding resultant data blocks, and generate at least one validation code based on the multiple corresponding resultant data blocks. The computing device also includes a transceiver, coupled to the one or more processors, configured to communicate to a remote device at least the multiple corresponding resultant data blocks and the at least one validation code.

In some variations, an apparatus is provided that includes means for dividing data into multiple data blocks, means for including, for each of the multiple data blocks, a portion of a respective at least one other of the multiple data blocks to produce multiple corresponding resultant data blocks, means for generating at least one validation code based on the multiple corresponding resultant data blocks, and means for communicating to a remote device at least the multiple corresponding resultant data blocks and the at least one validation code.

In some variations, a non-transitory computer readable media is provided, that is programmed with instructions, executable on a processor, to divide data into multiple data blocks, include, for each of the multiple data blocks, a portion of a respective at least one other of the multiple data blocks to produce multiple corresponding resultant data blocks, generate at least one validation code based on the multiple corresponding resultant data blocks, and communicate to a remote device at least the multiple corresponding resultant data blocks and the at least one validation code.

In some variations, another method is provided that includes receiving at a destination device multiple data blocks, with each of the multiple data blocks including a portion of at least one other of the multiple data blocks, receiving at the destination device at least one validation code generated based on the multiple data blocks, generating reconstructed data, at the destination device, from the received multiple data blocks, based, at least in part, on the respective portion of the at least one other of the multiple data blocks included with the each of the multiple data blocks, and performing a verification of data received at the destination device in the multiple data blocks based, at least in part, on the received at least one validation code.

In some variations, another computing device is provided that includes a transceiver configured to receive at the other computing device multiple data blocks, with each of the multiple data blocks including a portion of at least one other of the multiple data blocks, and receive at the other computing device at least one validation code generated based on the multiple data blocks. The other computing device also includes one or more processors, coupled to the transceiver, configured to generate reconstructed data, at the other computing device, from the received multiple data blocks, based, at least in part, on the respective portion of the at least one other of the multiple data blocks included with the each of the multiple data blocks, and perform a verification of data received at the other computing device in the multiple data blocks based, at least in part, on the received at least one validation code.

In some variations, another apparatus is provided that includes means for receiving at a destination device multiple data blocks, with each of the multiple data blocks including a portion of at least one other of the multiple data blocks, means for receiving at the destination device at least one validation code generated based on the multiple data blocks, means for generating reconstructed data, at the destination device, from the received multiple data blocks, based, at least in part, on the respective portion of the at least one other of the multiple data blocks included with the each of the multiple data blocks, and means for performing a verification of data received at the destination device in the multiple data blocks based, at least in part, on the received at least one validation code.

In some variations, a non-transitory computer readable media is provided, that is programmed with instructions, executable on a processor, to receive at a destination device multiple data blocks, with each of the multiple data blocks including a portion of at least one other of the multiple data blocks, receive at the destination device at least one validation code generated based on the multiple data blocks, generate reconstructed data, at the destination device, from the received multiple data blocks, based, at least in part, on the respective portion of the at least one other of the multiple data blocks included with the each of the multiple data blocks, and perform a verification of data received at the destination device in the multiple data blocks based, at least in part, on the received at least one validation code.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements.

DETAILED DESCRIPTION

Figure 1:
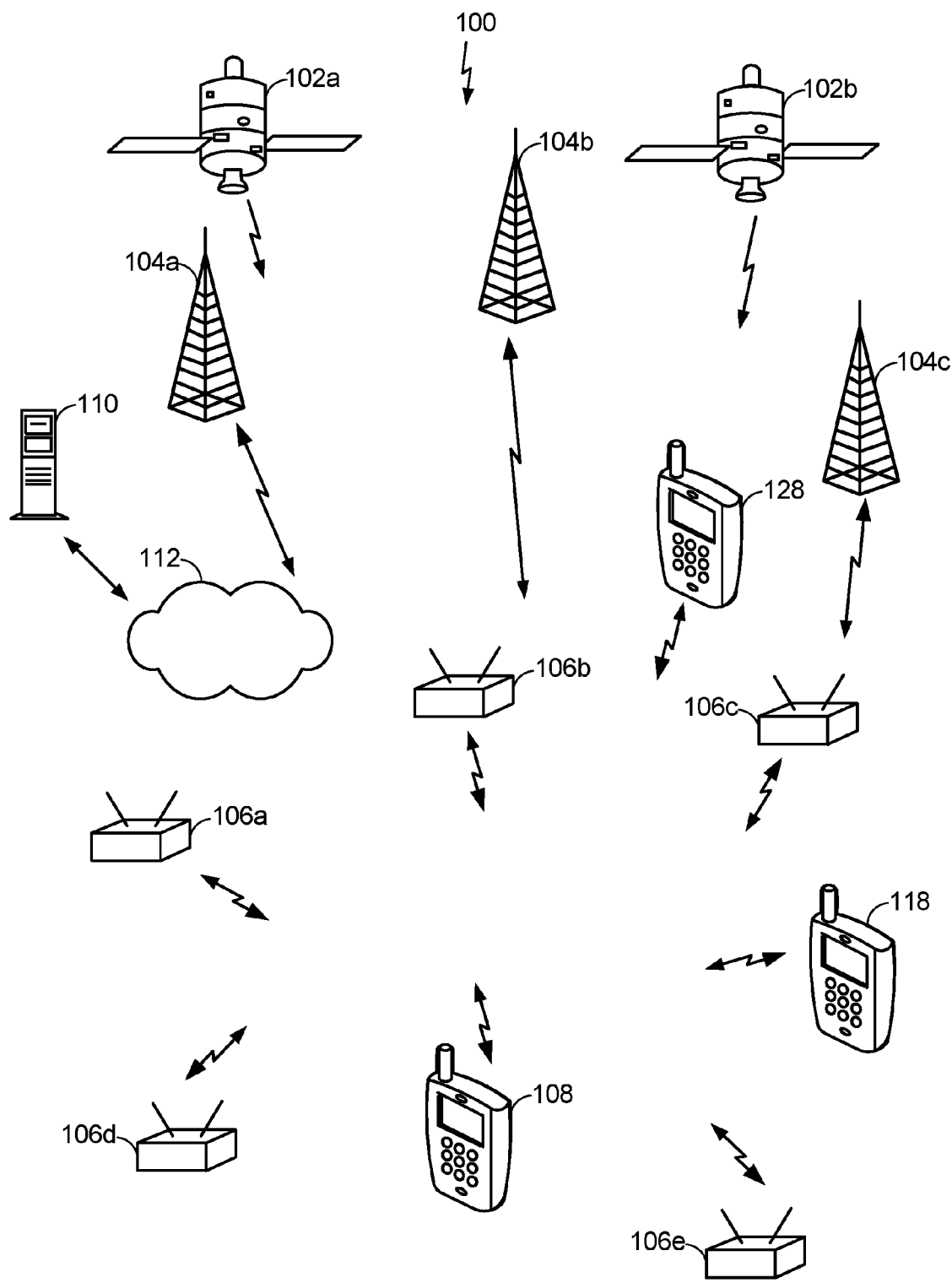
FIG. 1 is a diagram of an example operating environment that includes a wireless device in communication with one or more devices.

Described herein are methods, systems, devices, apparatuses, computer-/processor-readable media, and other implementations for data communication. A data block is split up into multiple blocks. In some embodiments, the partitioned blocks include overlapping sections, e.g., a particular data block may contain a data portion from a previous block (for example, at the particular block's beginning), and may also contain another data portion (for example, at the particular block's end) from another data block. These blocks can then be hashed (or some other type of validation function may be applied), and the hashes may be combined (e.g., concatenated) and again hashed to produce a hash list, or a Merkle tree. Advantages of the implementations described herein are: 1) the probability of causing a hash collision is reduced, so a shorter hash function can be used, reducing hash computation overheads (also, if the use is vulnerable to a significant effort attack, a normal length hash can be used with a significantly reduced chance of a replacement attack succeeding), and 2) little or no ordering/positioning information is needed to transmitted with the blocks because the blocks' order/positions within a record can be deduced from the added headers and footers.

Thus, in some embodiments, a method is provided that includes dividing/partitioning data (containing content of any possible data format or type, including video data, audio data, text-based data, metadata, etc.) into multiple data blocks, and including, for each of the multiple data blocks, a portion of a respective at least one other of the multiple data blocks to produce multiple corresponding resultant data blocks. The method further includes generating at least one validation code (e.g., according to on a hash function, a cyclic redundancy check (CRC) code, or any other type of validation code) based on the multiple corresponding resultant data blocks, and communicating to a remote device (e.g., another wireless device in a peer-to-peer system) at least the multiple corresponding resultant data blocks and the at least one validation code. In some embodiments, including, for the each of the multiple data blocks, the portion of the respective at least one other of the multiple data blocks to produce the multiple corresponding resultant data blocks may include appending to a respective beginning part (the beginning part may refer to the right-most part of a block, but may refer, in some embodiments, to the left-most part of the block) of an $i^{th}$ block, $D_i$, of N data blocks, an end portion of an $(i+1)^{th}$ data block, $D_{i+1}$, and appending to a respective end part (e.g., the left-most part of the block) of the $i^{th}$ block, $D_i$, a beginning portion of an $(i-1)^{th}$ data block, $D_{i-1}$. In some embodiments, generating the at least one validation code may include generating a validation code for each of the multiple corresponding resultant data blocks to generate multiple corresponding validation codes for the multiple corresponding resultant data blocks. The data communication and verification operations may also include combining (concatenating, performing a binary or logical operation, etc.) at least some of the generated multiple corresponding validation codes to generate a concatenated validation code, applying a validation function (e.g., a hash function which may be the same or different than that which may be applied to the data blocks) to the combined validation code to generate a resulting validation code, and communicating to the remote device at least the generated resulting validation code. In some implementations, because the block position in a chain (e.g., constituting the data, or data record/structure, that is or was partitioned) can be identified in relation to other blocks based on the data added/padded to the block, the order of transmission of the blocks becomes unimportant. In situations where a transmission (such as of a file) does not have clear header data, then such a header would need to be added to the first block before the process is applied in order to determine the start of the data.

Also provided herein are systems, methods, devices, media, and other implementations, including a method that includes receiving at a destination device multiple data blocks, each of the data blocks including a portion of at least one other of the multiple data blocks, receiving at the destination device at least one validation code generated based on the multiple data blocks, generating reconstructed data (e.g., the original data), at the destination device, from the received multiple data blocks, based, at least in part, on the respective portion of the at least one other of the multiple data blocks included with the each of the multiple data blocks, and performing a verification of data received at the destination device in the multiple data block based, at least in part, on the received at least one validation code.

With reference to FIG. 1, shown is a schematic diagram of an example operating environment 100 that includes a wireless device (also referred to as a mobile wireless device or as a mobile station) 108 in communication with one or more wireless devices. The various wireless devices of FIG. 1 (be they mobile devices, such as the personal mobile devices 108, 118, and/or 128, or stationary devices, such as the access points 106*a-e* or the base stations 104*a-c*) may be configured to communicate according to one or more communication protocols (e.g., near-field protocols, such as Bluetooth® wireless technology, or Zigbit, WLAN protocols, such as a WiFi protocol according to IEEE 802.11k standard, WWAN protocols, etc.) One or more of the devices illustrated in FIG. 1 may be part of or form a peer-to-peer system (also referred to as P2P system) to facilitate performance of transactions, or other interactions, between the devices of such a P2P system. A P2P system generally does not have a central server that controls operation of the system, but rather each device, such as any of the personal devices 108, 118, and 128, and/or communication nodes such as the access points, servers, and base stations depicted in FIG. 1, can establish communication links with one, some, or all of the other devices in the system, and be configured to serve as a client or server for any of those other devices, allowing those other devices access to its resources. For example, each of the personal mobile devices 108, 118, 128, and/or the other devices and nodes illustrated in FIG. 1 may maintain a repository of data files, records, or other structures, each of which may be requested by another device. As will be discussed in greater detail below, the various wireless devices of FIG. 1, including, the mobile device 108, may be configured, in some embodiments, to divide or partition data (e.g., in response to a request for data from another device, or on its own accord) into multiple data blocks, and for each of the multiple data blocks, including a portion of a respective at least one other of the multiple data blocks (e.g., logically adjacent blocks) to produce multiple corresponding resultant data blocks. The various wireless devices are also configured to generate at least one validation code based on the multiple corresponding resultant data blocks (and in some embodiments, to generate multiple corresponding validation codes for the respective multiple corresponding resultant data blocks), and to communicate to a remote device (e.g., a mobile or stationary device in a peer-to-peer network) at least the multiple corresponding resultant data blocks and the at least one validation code. In some embodiments, a device may communicate a block of data together with (e.g., during a particular transmission interval) a validation code for a preceding or a subsequent data block. The various devices of FIG. 1 (including the mobile and stationary devices of FIG. 1) may also be configured to receive data blocks and a validation code(s) transmitted by another device, and to reconstruct and verify the data blocks received. For example, because received data blocks may include added data portion from at least another one of the blocks constituting the original data (e.g., data record/structure, or data chain), a data block's position in the chain/record (relative to the other block(s) from which the added data portion(s) came) can be determined based on the data added to it from those other blocks.

The mobile device 108 (as well as any other device depicted in FIG. 1) may be configured to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, other mobile devices (e.g., the mobile devices 118 and 128 depicted in FIG. 1), etc., and as such the mobile device 108 may include one or more interfaces and/or transceivers to communicate with the various types of communications systems. The various devices of FIG. 1 may be configured to establish and operate according to any number of communication protocols.

As noted, the environment 100 may contain one or more different types of wireless communication systems or nodes. Such nodes include wireless access points (or WAPs) and may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include the Local Area Network Wireless Access Points (LAN-WAPs) 106a-e that may be used for wireless voice and/or data communication with the mobile device 108. The LAN-WAPs 106a-e may also be utilized, in some embodiments, as independents sources of position data, e.g., through fingerprinting-based procedures, through implementation of multilateration-based procedures based, for example, on timing-based techniques (e.g., RTT-based measurements), signal strength measurements (e.g., RSSI measurements), etc. The LAN-WAPs 106a-e can be part of a Wireless Local Area Network (WLAN), which may operate in buildings and perform communications over smaller geographic regions than a WWAN. Additionally in some embodiments, the LAN-WAPs 106a-e could also include pico or femto cells. In some embodiments, the LAN-WAPs 106a-e may be part of, for example, WiFi networks (802.11x), cellular piconets and/or femtocells, Bluetooth® wireless technology Networks, etc. Although five (5) LAN-WAPs are depicted in FIG. 1, any number of such LAN-WAP's may be used, and, in some embodiments, the environment 100 may include no LAN-WAPs at all, or may include a single LAN-WAP.

As further illustrated, the environment 100 may also include a plurality of one or more types of the Wide Area Network Wireless Access Points (WAN-WAPs) 104a-c, which may be used for wireless voice and/or data communication, and may also serve as another source of independent information through which the mobile wireless device 108 (and/or other devices) may determine its position/location. The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-c within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

Communication to and from the mobile device 108 (to exchange data, provide location determination operations and services to the device 108, etc.) may be implemented using various wireless communication networks and/or technologies such as a wide area wireless network (WWAN), a wireless local area network (WLAN), a wireless personal area network (WPAN), a peer-to-peer network, and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 108 may also be configured to at least receive information from a Satellite Positioning System (SPS) 102a-b, which may be used as an independent source of position information for the mobile device 108. The mobile device 108 may thus include one or more dedicated SPS receivers configured to receive signals for deriving geo-location information from the SPS satellites. In embodiments in which the mobile device 108 can receive satellite signals, the mobile device may utilize a receiver (e.g., a GNSS receiver) specifically implemented for use with the SPS to extract position data from a plurality of signals transmitted by at least the SPS satellites 102a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise enabled, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As further shown in FIG. 1, the system 100 may further include a server 110 (e.g., a location server, or any other type of server) configured to communicate, via a network 112 (e.g., a cellular wireless network, a WiFi network, a packet-based private or public network, such as the public Internet), or via wireless transceivers included with the server 110, with multiple network elements or nodes, and/or mobile wireless devices. For example, the server 110 may be configured to establish communication links with one or more of the WLAN nodes, such as the access points 106a-e, which may be part of the network 112, to communicate data and/or control signals to those access points, and receive data and/or control signals from the access points. Each of the access points 106a-e can, in turn, establish communication links with mobile devices located within range of the respective access points 106a-e. The server 110 may also be configured to establish communication links (directly via a wireless transceiver(s), or indirectly, via a network connection) with one or more of the WWAN nodes, such as the WWAN access points 104a-c depicted in FIG. 1, which may also be part of the network 112, and/or to establish communication links with one or more mobile wireless devices, such as any of the device 108, 118, and/or 128 of FIG. 1. The server 110 may also be configured to at least receive information from satellite vehicles 102a and/or 102b of a Satellite Positioning System (SPS), which may be used as an independent source of position information. In some embodiments, the server 110 may be part of, attached to, or reachable from network 112, and may communicate with the mobile wireless devices 108, 118, and/or 128 (or with any other device or node depicted in FIG. 1), directly or via some network.

Figure 2:
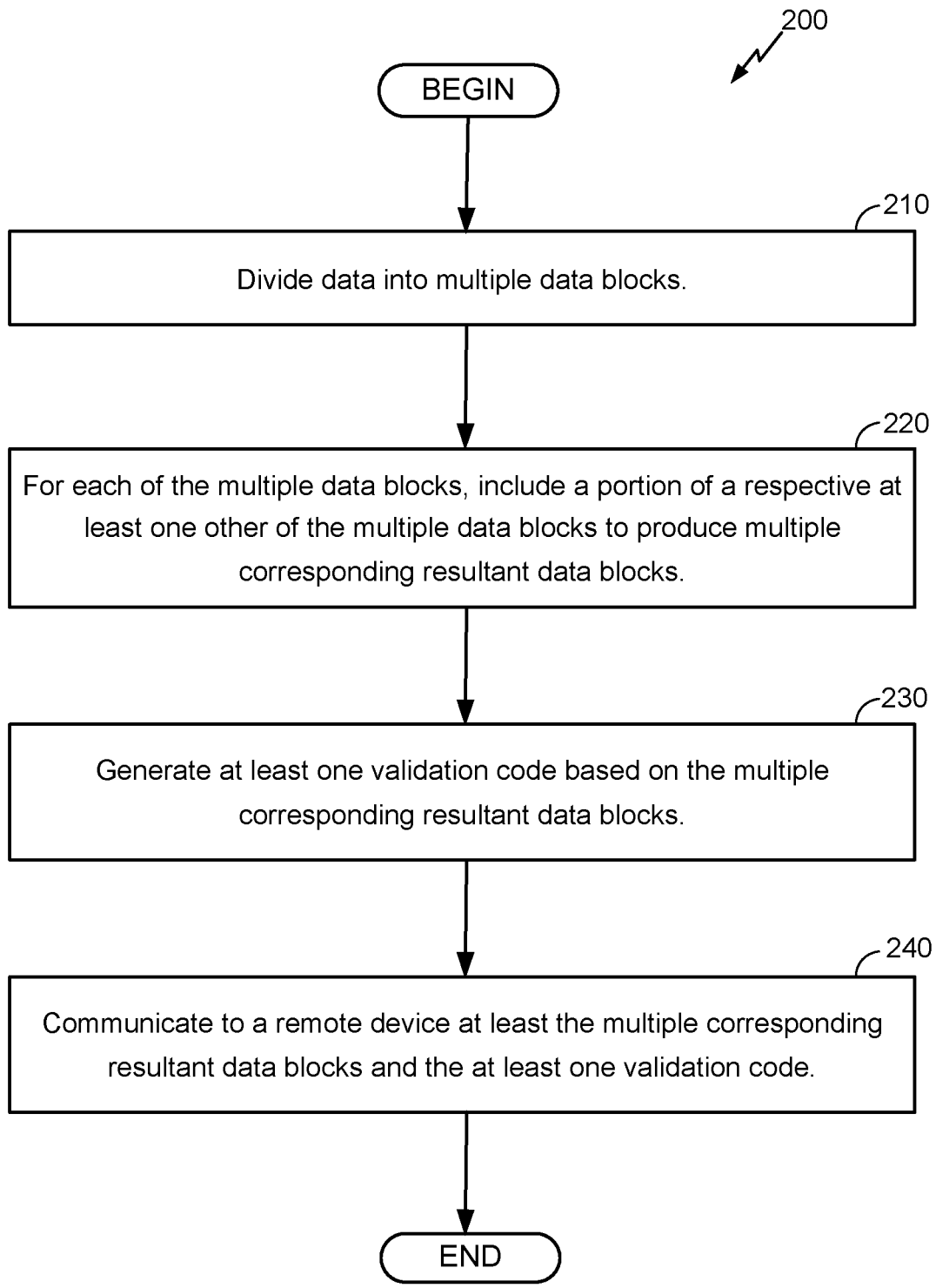
FIG. 2 is a flowchart of an example procedure to communicate data.
Figure 3:
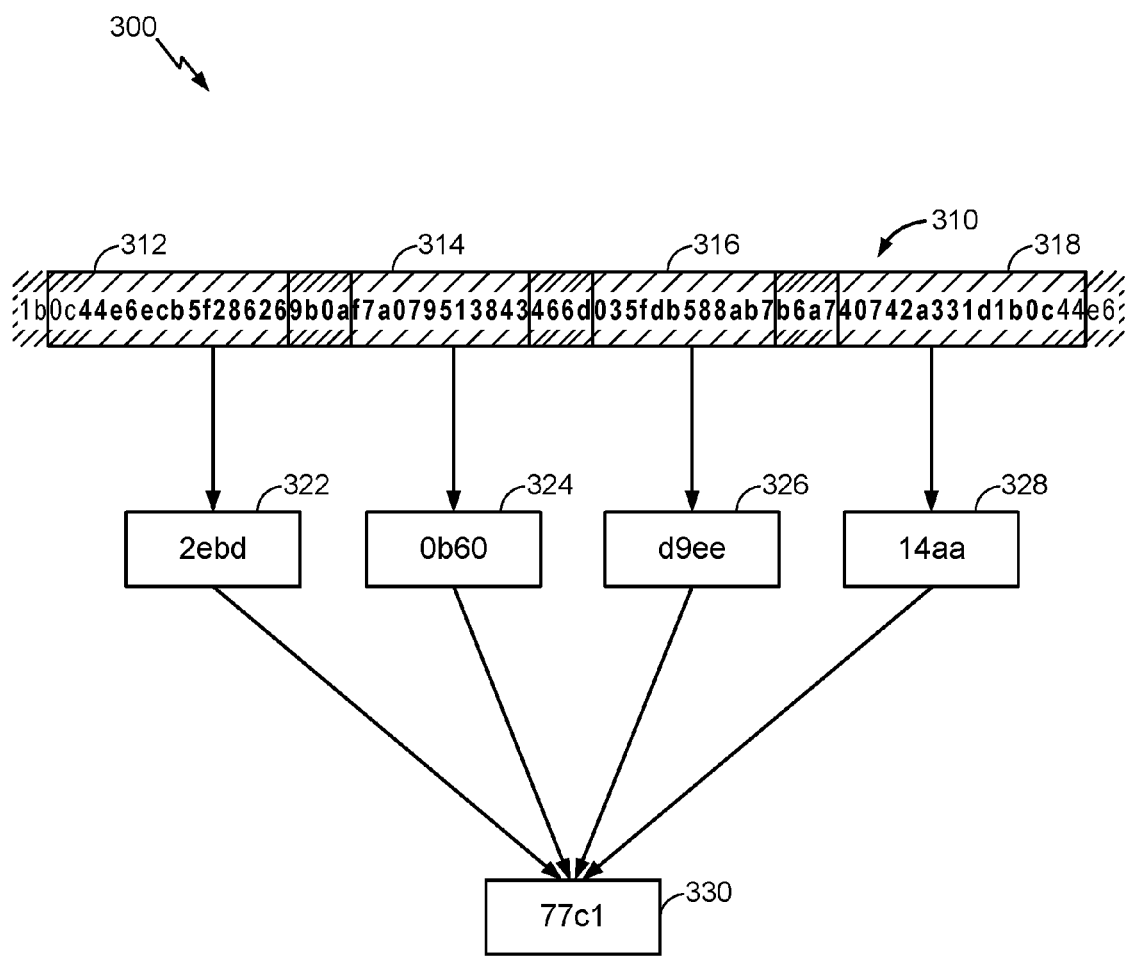
FIG. 3 is a diagram illustrating example operations performed according to a procedure to communicate data, such as the procedure of FIG. 2.

With reference to FIG. 2, a flowchart of an example procedure 200 to communicate data is shown. The procedure 200 may be performed at a computing device such as a mobile device (e.g., a personal mobile device), or at a stationary device (such as an access point). Description of the procedure 200 is further given with respect to FIG. 3 showing a diagram illustrating example operations performed according to, for example, the procedure 200. The example procedure 200 includes dividing (or partitioning) 210 data (may also be referred to as data record, data structure, data chain, etc.) into multiple data blocks. For each of the resulting multiple data blocks, a portion of a respective at least one other of the multiple data blocks is included 220 (e.g., added or padded) to produce multiple corresponding resultant data blocks. For example, in some embodiments, including, for the each of the multiple data blocks, the portion of the respective at least one other of the multiple data blocks to produce the multiple corresponding resultant data blocks may include appending to a respective beginning part (e.g., the part at the right-end of the block, as it appears in FIG. 3, which may correspond to the least significant bits of the block in a little-endian system, or may correspond to the most significant bits in a big-endian system) of an $i^{th}$ block, $D_i$, of N data blocks, an end portion of an $(i+1)^{th}$ data block, $D_{i+1}$, and appending to a respective end part (e.g., the part at the left-end of the block, as it appears in FIG. 3, which may correspond to the most significant bits of the block in a little-endian system or may correspond to the least-significant bits in a big-endian system) of the $i^{th}$ block, $D_i$, a beginning portion of an $(i-1)^{th}$ data block, $D_{i-1}$. In such embodiments, the first and last block may be wrapped around so that the beginning portion of the last block (i.e., block N) is added/appended to the end portion (e.g., the left-end portion) of the first block (i.e., block 1) of the partitioned data, and the end portion of the first block is added/appended to the beginning portion (e.g., the right-end portion) of the last block (block N). Thus, for example, the data communication procedure may include appending to the respective end part (e.g., left-most part) of a first block, $D_1$, of the N data blocks, a beginning portion (e.g., the right-most part) of an $N^{th}$ block, $D_N$, and appending to the respective beginning part (e.g., the right-end part) of the first data block, $D_1$, an end portion (e.g., the left-end portion) of a second block $D_2$.

To illustrate, consider the following example of an ordered list of data (in hexadecimal format) of:

44e6ecb5f286269b0af7a079513843466d035fdb588ab7b6a740742a331d1b0c.

For the remainder of the discussion provided herein, and for the sake of convenience and ease of reference, the term "beginning" will refer to the right part of a sequence of characters/digits/bits (as it appears in the accompanying drawings and examples), and the term "end" will refer to the left part of the sequence of characters/digits/bits (as it appears in the accompanying drawings and examples). In some embodiments, the terms "beginning" and "end" may refer to other positions of a data structure/record (e.g., "beginning" may refer to the left part of a block or chain, and "end" may refer to the right part of the block or chain). The above example data (also referred to as a data record or data structure) may be split it into blocks, e.g., four (4) sixteen (16) character blocks that are then each padded at the beginning and end with the right-most two characters (also referred to as digits, content, bits, or values) of the previous block (e.g., the two least-significant characters of the previous block in a little-endian system, or the two most-significant bits of the previous block in a big-endian system) and the first two characters of the next block (with a wrap-around for the first and last blocks) to obtain:

B1=0c44e6ecb5f286269b0a,
B2=9b0af7a079513843466d,
B3=466d035fdb588ab7b6a7, and
B4=b6a740742a331d1b0c44.

Thus, for example, a fourth block 318 of a record 310 depicted in FIG. 3, whose original content (in hexadecimal) is 'a740742a331d1b0c' has it beginning part (i.e., the rightmost part, corresponding to its least significant part in, for example, a little-endian system, or to its most significant part in a big-endian system) padded with the value '44', which corresponds to the end portion (e.g., left-most portion) of a first block 312 of the record 310, and has its end part padded with 'b6', which corresponds to the beginning portion (i.e., the first two, right-most, characters) of a third block 316. The resultant four (4) 20 character blocks comprise the data to be transmitted over the network, e.g., from one device, such any of the mobile or stationary devices/nodes depicted in FIG. 1, to another device in the same or different network. By adding data portions from adjacent blocks, the ordered position of the block relative to other blocks constituting the original record can be derived (e.g., with little or no actual positioning or ordering information). Particularly, because, in these embodiments, data from adjacent blocks (e.g., the preceding and succeeding block) is used to pad a given block, the identity of the blocks that are adjacent (neighbors) of the given block can be determined based on the added data without needing to specify either the ordered position of the block in the original data or explicitly indicating the identity of the neighboring blocks of the given block.

In some embodiments, each block may be formed by including data portions from others of the partitioned blocks of the record, selected according to different schemes. For example, instead of using data from adjacent/neighboring blocks to add to a particular block, data added to the particular block may be data of a non-adjacent block, or may be data of a randomly (or pseudo-randomly) selected data block, or a block selected according to other possible block selection schemes. Furthermore, in some embodiments, the data added to a particular block may be from some other, non-related record, and may correspond to any portions of a record (not necessarily the beginning or end portions). Additionally, the data added to the particular block may be added at different places/positions in the particular block. The data portion size added to the particular block may also be of any size (e.g., 1 character, 2 characters, 4 characters, 5 characters, or any number of characters/digits/bits).

Having divided the original data into N data blocks, and having included in each such block a data portion from another data block to generate the multiple corresponding resultant data blocks, at least one validation code is generated 230 based on the multiple corresponding resultant data blocks. In some embodiments, generating the at least one validation code may include generating a validation code for each of the multiple corresponding resultant data blocks to generate multiple corresponding validation codes for the multiple corresponding resultant data blocks. The at least one validation code may be generated according to various possible validation code functions that may be used to produce a particular code for a corresponding particular block. In some implementations the particular data code and its corresponding validation code (or some other value derived from particular validation code) are generally transmitted (together or separately) to a destination device/node, and the validity of the received data block can be verified by applying the same validation code function or process to the received block(s), and comparing the validation code(s) computed from the received block to the validation code(s) computed at the source (i.e., at the originating device) and transmitted to the destination. Validation code functions that may be used include hash functions (e.g., SHA1 function), checksum functions, repetition code functions, parity bit(s)-type functions, cyclic redundancy check (CRC) functions, etc.

In the example of FIG. 3, generating the validation code may be performed by applying SHA1 hash function to each of the multiple resultant data blocks (e.g., the data blocks generated by dividing the original data, and adding data content to each of the data blocks), and retaining the first (e.g., right-most) 16 bits of the resultant hash code (different number of hash code bits may alternatively be kept and used). Thus, in the example of FIG. 3, respective validation codes 322, 324, 326, and 328 are generated for each of the multiple corresponding resultant data blocks 312, 314, 316, and 318, to yield $H(B1)=2ebd$, $H(B2)=0b60$, $H(B3)=d9ee$, $H(B4)=14aa$.

As noted, generated validation codes may be communicated to the destination device/node so that the destination device/nodes receives the resultant data blocks (generated from the original data) as well as the validation codes generated for each such block. In some implementations, the data blocks and generated validation codes may be communicated to the destination as frames that each includes, for example, a resultant data block (i.e., a data block to which a portion of data from at least one other block has been added) and a validation code. The validation code included in a frame need not be the validation code for the resultant data block included in the frame, but may be a validation code for another data block. For example, a frame transmitted to the destination device may include a particular data block and the validation code for the subsequent or preceding data block (that is still to be transmitted, or that may have already been transmitted). Upon receiving the frame, the destination device can read the transmitted validation code and compare it to a computed validation code derived at the destination from an earlier received data block (e.g., in implementations where validation codes corresponding to preceding blocks are included with data frames). If there is a match between the transmitted validation code and the computed validation code derived at the destination, the data block corresponding to the validation code may be deemed to have been transmitted without error.

To facilitate verification of large data structures, generating validation codes may include generating hash trees or Merkle trees. In such tree structures, the individual validation codes generated for the separate data blocks may be combined (e.g., two or more such validation codes may be concatenated), and a resultant validation code for the combined two or more validation codes is computed by applying a validation code function (which may be the same, or different from, the validation code function applied to the individual data blocks). Thus, in such embodiments, generating validation codes for the data blocks may include combining, e.g., concatenating, two or more of the generated multiple corresponding validation codes to generate at least one concatenated validation code, and applying the validation code function to the at least one combined validation code to generate a resulting validation code. Although the example of FIG. 3 illustrates a combining operation implementing a concatenation operation, other types of combining operations may be used, including, for example, interlacing operations, XOR operations, other types of binary and/or logical operations, etc. The generated resulting validation code may then be communicated to the destination device/node. To illustrate, in the example of FIG. 3, the four (4) hash codes generated for the four resultant data blocks corresponding to the data 310 are concatenated (the hash codes may be combined in some other manner), and the same hash function (16 right-most characters of a SHA1 function applied to the combined hash codes) is generated to produce the root hash 330 of H(H(B1)+ . . . +H(B4))=H (2ebd0b60d9ee14aa)=77c1. The depth of the tree structure may be based on how many blocks are generated from an original data structure, and/or how validation codes are combined. For example, instead of combining all four of the generated hash codes for the 4 data blocks, two pairs of two hash codes could have been combined, resulting in two additional hash codes that could again have been combined in order to produce a further hash code. In that case, the structure 300 depicted in FIG. 3 would have had four levels (the data blocks would comprise one of the four level, and the hash codes would comprise the other three levels). Thus, the procedures and implementations described herein may also include combining at least some of the generated multiple corresponding validation codes to generate a combined validation code, applying a validation function to the combined validation code to generate a resulting validation code, and communicating to the remote device at least the generated resulting validation code. Combining the at least some of the generated multiple corresponding validation codes to generate the combined validation code may include performing one or more of, for example, a concatenation operation and/or a binary or logical operation on the at least some of the generated multiple corresponding validation codes to generate the combined validation code.

With continued reference to FIG. 2, at least the multiple corresponding resultant data blocks and the at least one validation code are communicated 240 to a remote device (e.g., a personal mobile device, a stationary network node, etc.) As noted, in some implementations, the data blocks and the validation codes may be communicated (e.g., wirelessly transmitted, or transmitted through wired links) using multiple data frames (e.g., discrete transmissions over discrete time intervals). In such implementations, a particular data frame may include one or more data blocks, and one or more validation codes corresponding to the same or other data blocks. For example, a first data frame communicated to a remote device may include a first data block (of some data that has been divided/partitioned) and a validation code for a second (e.g., neighboring) data block. A second data frame, that includes the data block from which the validation code for the second data block was generated, may subsequently be communicated to the remote device (along with a validation code for a third data block, for example). Alternatively, in some embodiments, a data frame may include a particular data block whose corresponding validation code is transmitted in a subsequent data frame (i.e., the data block will arrive at the destination before the corresponding validation code). Thus, in some embodiments, communicating to the remote device the at least the multiple corresponding resultant data blocks and the at least one validation code may include communicating to the remote device multiple data frame, each of the multiple data frames comprising at least one of the multiple resultant data blocks and at least one validation code corresponding to another, different, one of the multiple resultant data blocks. The remote device may then compute for the second data block (received in the subsequent data frame) a computed validation code, and compare that computed validation code to the validation code (which, in some embodiments, was received with the first data frame, and in some embodiments, will have been received in a subsequent data frame), in order to verify that the second data block was properly received (e.g., uncorrupted). In some embodiments, the at least one validation code communicated to the remote destination device may include only the validation code generated from the respective individual validation codes (i.e., that validation code may have been generated by combining, e.g., concatenating, the validation codes for the individual blocks, and applying the validation function thereto). In such embodiments, validation codes from the received data blocks transmitted to the destination device are computed and combined, and a validation code is then derived from the combined computed validation codes. That derived validation code can then be compared to the transmitted validation code, and the result of the comparison can be used to verify the correctness of the transmitted data blocks. Alternatively and/or additionally, the at least validation code transmitted from the originating device may also include the individual validation codes generated from the resultant (i.e., padded) data blocks.

In some embodiments, the resultant data blocks and the at least one validation code may be communicated with at least a portion of the communicated data being processed (e.g., signed/encrypted) using a private key (from an asymmetric private/public cryptographic key, such as an ECDSA key) assigned to the originating/transmitting device to confirm that authenticity of the communicated data. The receiving (e.g., destination) device can subsequently use the public key of the originating device (that public key may already be available at the destination device) to decrypt the encrypted portion of the transmitted data to thus confirm the authenticity of the data. For example, data transmitted by the originating device (such as the mobile device 108 of FIG. 1) may include some predetermined message that is encrypted using the originating device's private key. The receiving/destination device decrypts that encrypted message to recover the message, and compares it to the expected predetermined message that was supposed to be sent by the originating device. If there is a match, the data received at the destination device is deemed to have been received from the correct device or user. In some embodiments, in addition to encrypting at least a portion of the data communicated by the originating device in order to authenticate the data, some other portion of the communicated data may be encrypted so as to secure the data. For example, the data transmitted may be encrypted using a secret encryption key (which may be a symmetric or asymmetric cryptographic key) that is known, or is disclosed, to the receiving/destination device.

Figure 4:
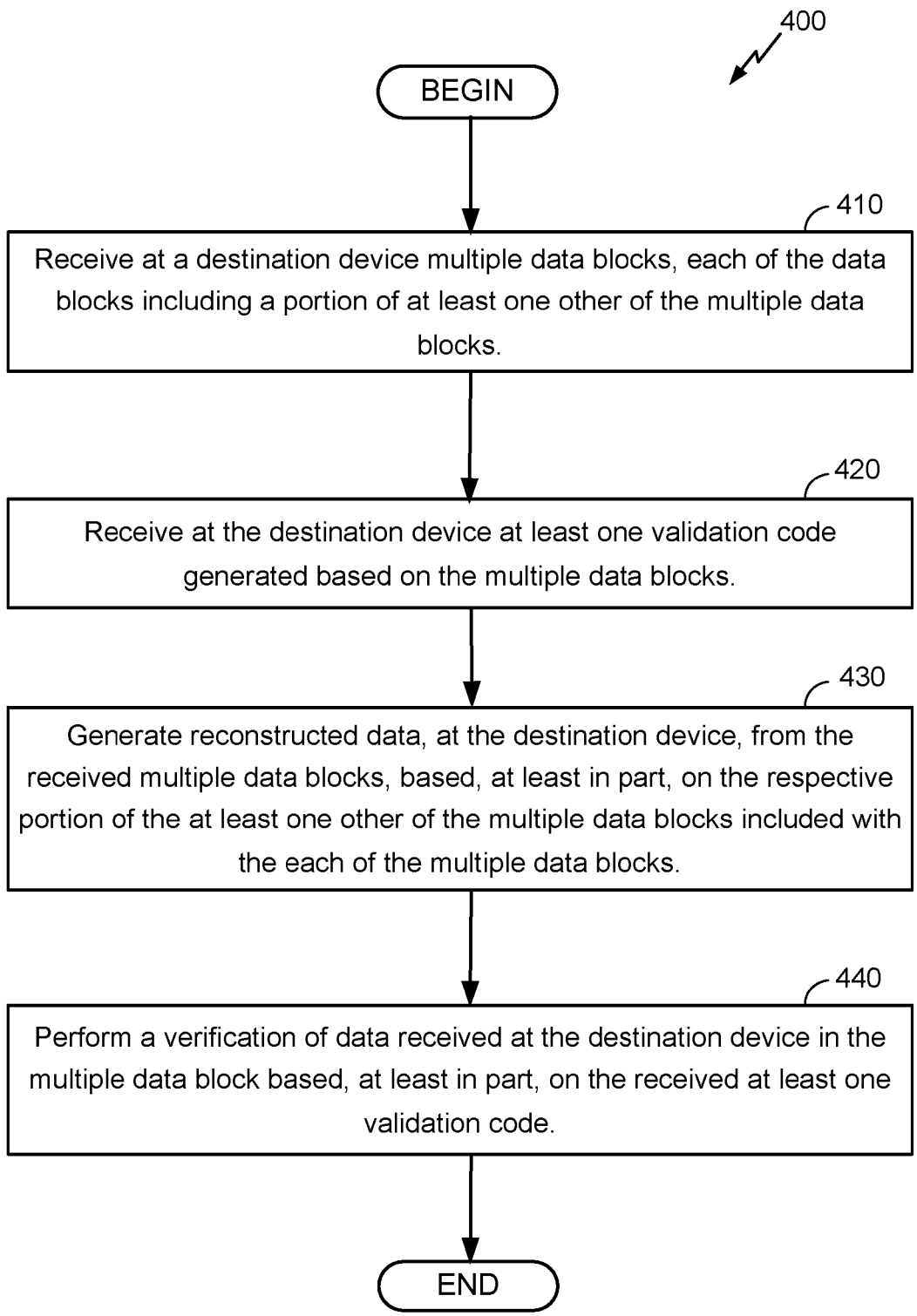
FIG. 4 is a flowchart of an example procedure to reconstruct and verify data transmitted from a remote device.

With reference now to FIG. 4, a flowchart of an example procedure 400, generally performed at a destination device (be it a mobile device, or a stationary device or node) to reconstruct and verify data transmitted from an originating device is shown. The example procedure 400 includes receiving 410 at a destination device (e.g., a mobile device, such as the devices 108, 118 or 128 depicted in FIG. 1, or a stationary device, such as any of the access points or other nodes depicted in FIG. 1) multiple data blocks, with each of the data blocks including a portion of at least one other of the multiple data blocks. The originating and destination devices may be part of a peer-to-peer network, or may be part of some other type of network. As described herein (e.g., with respect to FIGS. 2 and 3), data that is to be communicated from an originating (source) device to the destination device may be divided/partitioned into multiple blocks, with each block then padded (e.g., at the originating device) with data from another one of the multiple blocks. For example, data from an end portion (e.g., left-most portion corresponding to the most-significant portion in a little-endian system) of a second data block may have been added to a beginning part (corresponding to the right-most portion) of a first, neighboring, data block, while the end part of that first data block may have been padded with a beginning portion of a third data block (which may also be adjacent, i.e., a neighbor, of the first data block). Thus, for example, in such implementations, inclusion of data portions from other blocks in an $i^{th}$ block, $D_i$, of an original data (partitioned into N blocks) may include appending to a beginning part of $D_i$, an end portion of an $(i+1)^{th}$ data block, $D_{i+1}$, and appending to an end part of the $i^{th}$ block, $D_i$, a beginning portion of an $(i-1)^{th}$ data block, $D_{i-1}$. In this type of padding scheme, the resultant data blocks (with the included padding) will have overlapping data content with their neighboring resultant (i.e., padded) data blocks.

As further illustrated in FIG. 4, at least one validation code, generated based on the multiple data blocks, is received 420 at the destination device. The at least validation code (e.g., generated through application of a hash function, a CRC function, or some other validation function) may include the validation codes generated for each of the individual data blocks received at the destination device, and/or may include a validation code for a composite of the individual validation code. For example, in some embodiments, two or more of validation codes generated for individual data blocks (through application of a particular validation function) may be combined (e.g., concatenated), and a validation code for the combined two or more validation code may be derived (e.g., by applying the same or different validation function). In some embodiments, combining (e.g., concatenating) validation codes may be performed by constructing a Merkle or hash tree structure. It is to be noted that by padding a particular data block, thus increasing its size, the likelihood of validation code collisions (such as hash collisions) decreases because it becomes less likely that any two blocks would map into the same validation code (e.g., to the same hash code).

Having received the multiple data blocks, reconstructed data is generated 430, at the destination device, from the received multiple data blocks, based, at least in part, on the respective portion of the at least one other of the multiple data blocks included with the each of the multiple data blocks. More particularly, because each received data block includes a portion of another data block (of the same original data or data record/structure) in such a way that the relationship between the position, in the data, of one data block relative to the other data block can be determined, the original data can be re-assembled/reconstructed with no, or with minimal, explicit position information indicative of where the data blocks fit or need to be placed within the data. For example, in implementations in which data is padded with data portions from neighboring blocks (e.g., a $2^{nd}$ data block would be padded with the end portion of the $3^{rd}$ block and the beginning portion of the $1^{st}$ block), the identities of the neighboring block can be identified based on the actual content added to the beginning and end parts of the particular data block. For example, assume that the destination device receives the data block 'b6a740742a331d1b0c44' (corresponding to the fourth block 318 of FIG. 3). Because it is known, for this example, that data blocks are generated by padding the end and beginning parts of each of the data blocks with the data portions of neighboring data blocks, it can be determined, at the destination device, that the value 'b6' is the beginning portion of the data block preceding the data block 'b6a740742a331d1b0c44.' Accordingly, when reconstructing the data, the value 'b6' will be removed from the end part of the data block, and the data block will be placed next to the data block whose beginning portion is 'b6' (in this example, the data block 316 of FIG. 3). The other data blocks may be similarly processed to thus determine the order at which the data blocks are to be re-assembled.

Similar reconstruction processes can be used in situations involving different padding schemes (e.g., where the data included in each data block do not necessarily come from adjacent/neighboring blocks).

As also illustrated in FIG. 4, the procedure 400 further includes performing a verification 440 of data received at the destination device in the multiple data block based, at least in part, on the received at least one validation code. Thus, for example, the validation codes for each of the received data block are computed at the destination device by applying the same validation code functions that were applied at the originating device. If a validation code was generated and communicated to the destination device for each of the data blocks, the communicated validation codes and the validation codes computed at the destination device (from the received data blocks) are compared to determine if they match each other (if there is a discrepancy between the validation code received for a particular block and the validation code computed at the destination device for that particular block, a determination may be made that a communication problem had occurred, and that the block or data may need to be re-transmitted, or that some other remedial operation needs to be performed). Alternatively and/or additionally, if the validation code(s) received at the destination device includes a validation code derived from a combination or composite of the other validation codes, the particular process used at the originating device to generate that validation code (e.g., generate validation codes for each of the blocks, combine the individual codes in a particular manner, and generate a validation code therefrom) is repeated at the destination device, and the resulting computed validation code is then compared to the received validation code to determine if the two match. With respect to the example of FIG. 3, at the destination device, a validation code is generated by applying the validation function (e.g., the 4 right-most characters, of a hash value obtained from application of a SHA1 function) to the combined value of the four (4) hash values obtained for each of the four (4) data blocks. That generated validation code can then be compared to corresponding received validation code ('77c1') to determine if there is a discrepancy between the two.

Figure 5:
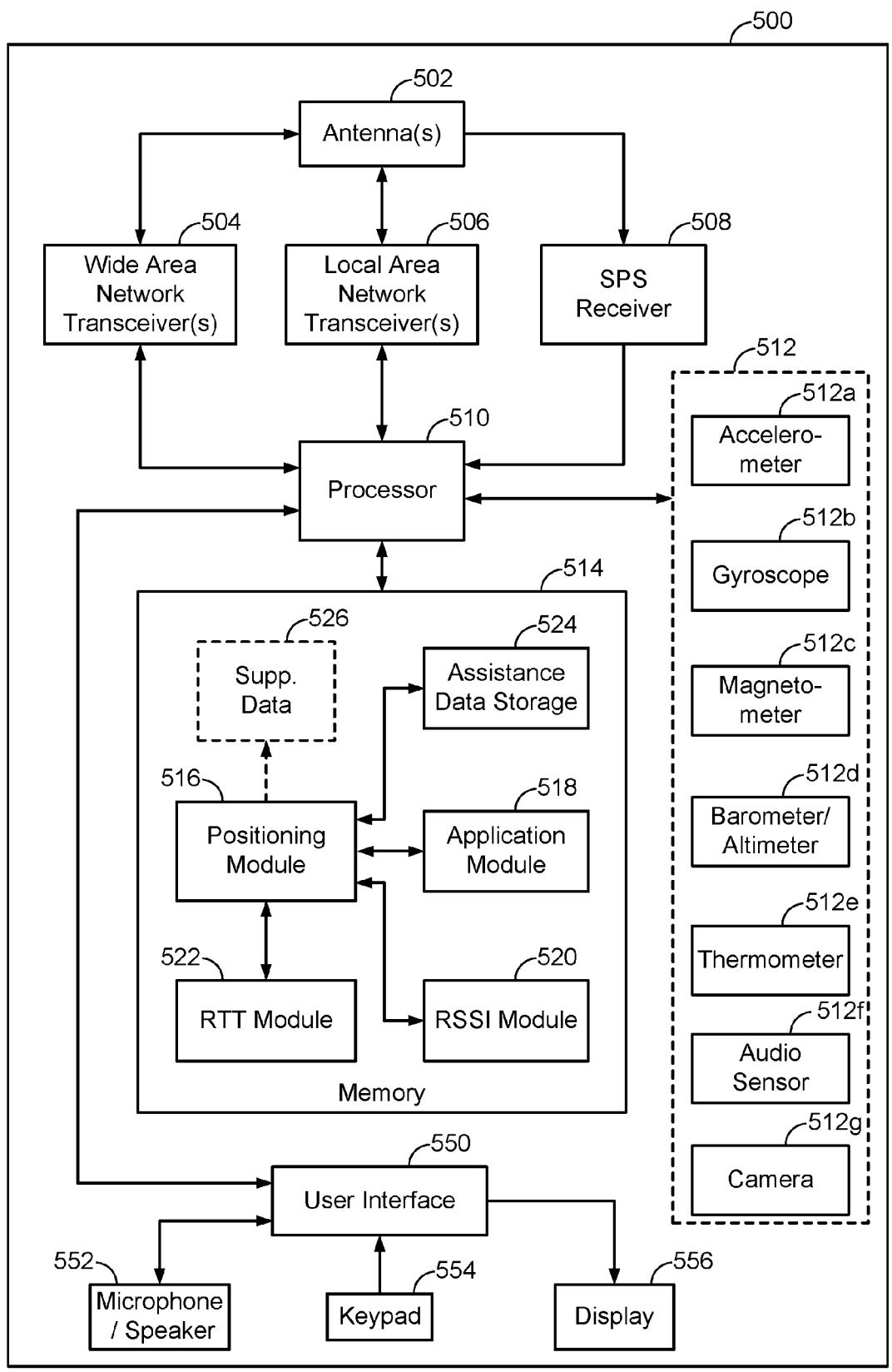
FIG. 5 is a schematic diagram of an example wireless device (e.g., a mobile wireless device).

With reference now to FIG. 5, a schematic diagram illustrating various components of an example wireless device 500 (e.g., a mobile device), which may be similar to or the same as the wireless devices 108, 118, and/or 128 depicted in FIG. 1 is shown. For the sake of simplicity, the various features/components/functions illustrated in the schematic boxes of FIG. 5 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 5 may be further subdivided, or two or more of the features or functions illustrated in FIG. 5 may be combined. Additionally, one or more of the features or functions illustrated in FIG. 5 may be excluded. In some embodiments, some or all of the components depicted in FIG. 5 may also be used in implementations of one or more of the nodes/devices 106a-e and/or 104a-c, and/or the server 110 illustrated in FIG. 1. In such embodiments, the components depicted in FIG. 5 may be configured to cause the operations performed by devices (wireless devices, servers, such as location servers, etc.) as described herein with respect to, for example, FIGS. 2-4 (e.g., to communicate data blocks and validation codes from one device to another, and/or reconstruct and verify data blocks received from another device).

As shown, the wireless device 500 may include one or more local area network transceivers 506 that may be connected to one or more antennas 502. The one or more local area network transceivers 506 comprise suitable devices, circuits, hardware, and/or software for communicating with and/or detecting signals to/from one or more of the WLAN access points 106a-e depicted in FIG. 1, and/or directly with other wireless devices (e.g., mobile devices) within a network. In some embodiments, the local area network transceiver(s) 506 may comprise a WiFi (802.11x) communication transceiver suitable for communicating with one or more wireless access points; however, in some embodiments, the local area network transceiver(s) 506 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The wireless device 500 may also include, in some implementations, one or more wide area network transceiver(s) 504 that may be connected to the one or more antennas 502. The wide area network transceiver 504 may comprise suitable devices, circuits, hardware, and/or software for communicating with and/or detecting signals from one or more of, for example, the WWAN access points 104a-c illustrated in FIG. 1, and/or directly with other wireless devices within a network. In some implementations, the wide area network transceiver(s) 504 may comprise a CDMA communication system suitable for communicating with a CDMA network of wireless base stations. In some implementations, the wireless communication system may comprise other types of cellular telephony networks, such as, for example, TDMA, GSM, WCDMA, LTE, etc. Additionally, any other type of wireless networking technologies may be used, including, for example, WiMax (802.16), etc.

In some embodiments, an SPS receiver (also referred to as a global navigation satellite system (GNSS) receiver) 508 may also be included with the wireless device 500. The SPS receiver 508 may be connected to the one or more antennas 502 for receiving satellite signals. The SPS receiver 508 may comprise any suitable hardware and/or software for receiving and processing SPS signals. The SPS receiver 508 may request information as appropriate from the other systems, and may perform the computations necessary to determine the position of the mobile device 500 using, in part, measurements obtained by any suitable SPS procedure. Additionally, measurement values for received satellite signals may be communicated to a location server configured to facilitate location determination.

As further illustrated in FIG. 5, the example wireless device 500 includes one or more sensors 512 coupled to a processor/controller 510. For example, the sensors 512 may include motion sensors to provide relative movement and/or orientation information (which is independent of motion data derived from signals received by the wide area network transceiver(s) 504, the local area network transceiver(s) 506, and/or the SPS receiver 508). By way of example but not limitation, the motion sensors may include an accelerometer 512a, a gyroscope 512b, and a geomagnetic (magnetometer) sensor 512c (e.g., a compass), any of which may be implemented based on micro-electro-mechanical-system (MEMS), or based on some other technology. The one or more sensors 512 may further include an altimeter (e.g., a barometric pressure altimeter) 512d, a thermometer (e.g., a thermistor) 512e, an audio sensor 512f (e.g., a microphone) and/or other sensors. The output of the one or more sensors 512 may be provided as data transmitted to a remote device or server (via the transceivers 504 and/or 506, or via some network port or interface of the device 500) for storage or further processing. As further shown in FIG. 5, in some embodiments, the one or more sensors 512 may also include a camera 512g (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The processor(s) (also referred to as a controller) 510 may be connected to the local area network transceiver(s) 506, the wide area network transceiver(s) 504, the SPS receiver 508 and the one or more sensors 512. The processor may include one or more microprocessors, microcontrollers, and/or digital signal processors that provide processing functions, as well as other calculation and control functionality. The processor 510 may be coupled to storage media (e.g., memory) 514 for storing data and software instructions for executing programmed functionality within the mobile device. The memory 514 may be on-board the processor 510 (e.g., within the same IC package), and/or the memory may be external memory to the processor and functionally coupled over a data bus. Further details regarding an example embodiment of a processor or computation system, which may be similar to the processor 510, are provided below in relation to FIG. 7.

A number of software modules and data tables may reside in memory 514 and may be utilized by the processor 510 in order to manage communications with remote devices/nodes (such as the various nodes and/or the server 110 depicted in FIG. 1), including to process data (e.g., arranged in records or other structures) in the manner described herein, perform positioning determination functionality, and/or perform device control functionality. As illustrated in FIG. 5, in some embodiments, the memory 514 may include a positioning module 516, an application module 518, a received signal strength indicator (RSSI) module 520, and/or a round trip time (RTT) module 522. It is to be noted that the functionality of the modules and/or data structures may be combined, separated, and/or be structured in different ways depending upon the implementation of the mobile device 500. For example, the RSSI module 520 and/or the RTT module 522 may each be realized, at least partially, as a hardware-based implementation, and may thus include such devices or circuits as a dedicated antenna (e.g., a dedicated RTT and/or an RSSI antenna), a dedicated processing unit to process and analyze signals received and/or transmitted via the antenna(s) (e.g., to determine signal strength of received signals, determine timing information in relation to an RTT cycle, etc.)

The memory 514 may thus include an application (which may be part of the application module 518) to implement a data communication and verification process (e.g., executing on the processor 510 of the mobile device 500) to divide/partition data (also referred to as a data record or data structure) into multiple blocks, include in each of the blocks data from at least another of the blocks, determine validation code(s), and communicate the blocks (with the added data) and the validation code(s) to a remote device. The memory 514 may also include another application to implement a process to reconstruct received data blocks into the original data (e.g., based on determining the position of the blocks in the original data according to the data added to them from other blocks forming the data to be reconstructed) and to perform data verification for the received data blocks. The application module 518 may include an application to implement a process which requests position information from the positioning module 516, or which receives positioning/location data from a remote device (e.g., a remote location server). Applications typically run within an upper layer of the software architectures, and may include indoor navigation applications, shopping applications, location aware service applications, etc. The positioning module/circuit 516 may derive the position of the wireless device 500 using information derived from various receivers and modules of the mobile device 500, e.g., based on measurements performed by the RSSI module and/or the RTT module. Data derived by the positioning module 516 may be used to supplement location information provided, for example, by a remote device (such as a location server) or may be used in place of location data sent by a remoted device. For example, the positioning module 516 may determine position of the device 500 based on measurements performed by various sensors, circuits, and/or modules of the device 500, and use those measurements in conjunction with assistance data received from a remote server to determine location of the device 500.

As further illustrated, the wireless device 500 may also include assistance data storage 524, where assistance data (which may have been downloaded from a remote server, from a remote device in a peer-to-peer network, etc.), such as map information, records relating to location information in an area where the device is currently located, heatmaps (e.g., indicative of expected signal strength values, for signals transmitted from one or more wireless device, at various locations), etc., is stored. In some embodiments, the wireless device 500 may also be configured to receive supplemental information that includes auxiliary position and/or motion data which may be determined from other sources (e.g., from the one or more sensors 512). Such auxiliary position data may be incomplete or noisy, but may be useful as another source of independent information for estimating the position of the device 500, or for performing other operations or functions. Supplemental information may also include, but not limited to, information that can be derived or based upon Bluetooth signals, beacons, RFID tags, and/or information derived from a map (e.g., receiving coordinates from a digital representation of a geographical map by, for example, a user interacting with a digital map). The supplemental information may optionally be stored in the storage module 526 schematically depicted in FIG. 5.

The wireless device 500 may further include a user interface 550 providing suitable interface systems, such as a microphone/speaker 552, a keypad 554, and a display 556 that allows user interaction with the device 500. The microphone/speaker 552 (which may be the same or different from the sensor 5120 provides for voice communication services (e.g., using the wide area network transceiver(s) 504 and/or the local area network transceiver(s) 506). The keypad 554 may comprise suitable buttons for user input. The display 556 may include a suitable display, such as, for example, a backlit LCD display, and may further include a touch screen display for additional user input modes.

Figure 6:
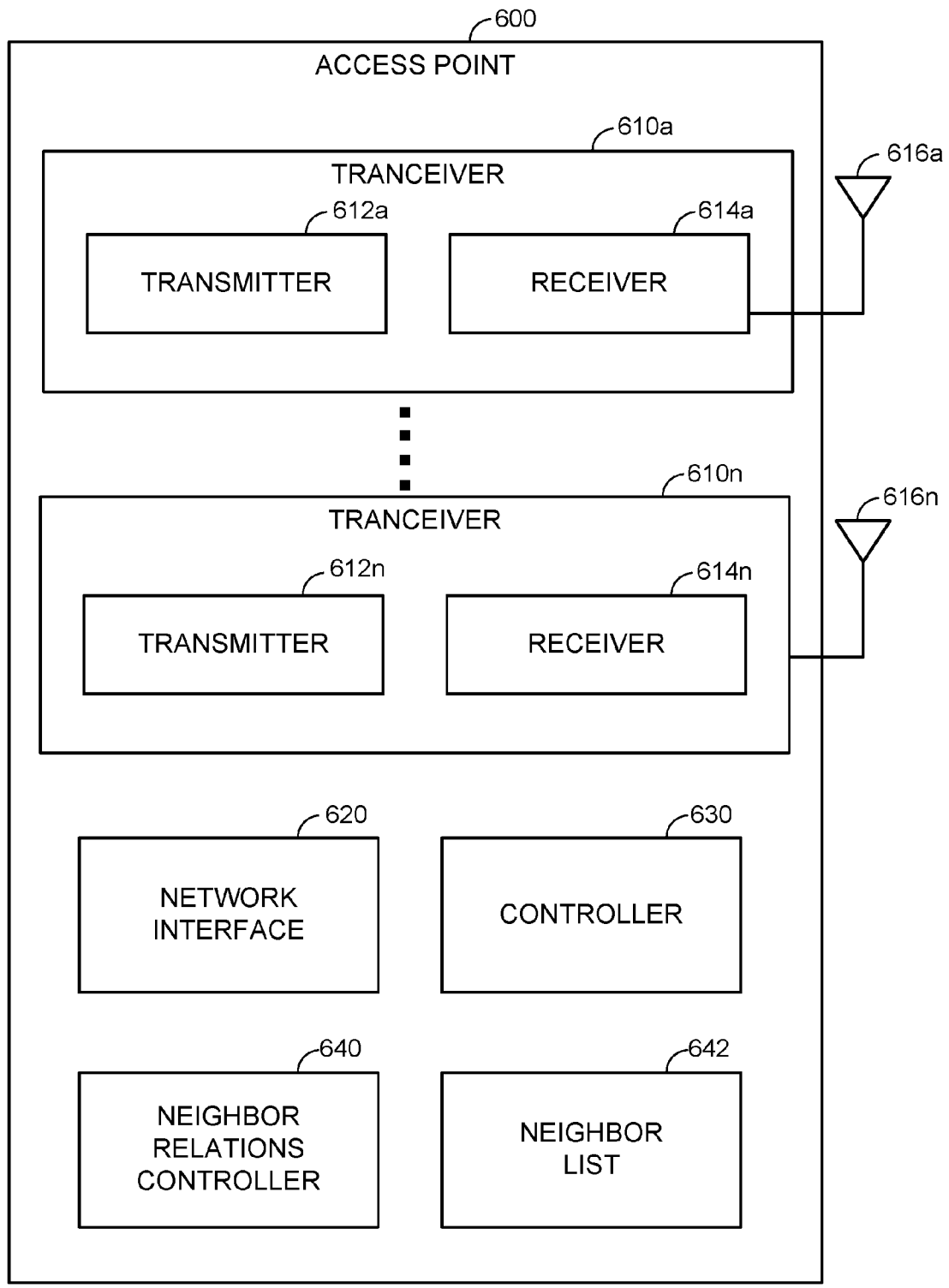
FIG. 6 is a schematic diagram of an example node (e.g., an access point).

With reference now to FIG. 6, a schematic diagram of an example wireless node 600, such as access point (which may be part of one or more networks, including a peer-to-peer network comprising personal mobile devices such as the device 108 and/or 500 of FIGS. 1 and 5, respectively), which may be similar to, and be configured to have a functionality similar to that, of any of the various nodes depicted in FIG. 1 (e.g., the nodes 104*a-c*, 106*a-e*, and/or the server 110), is shown. The node 600 may include one or more transceivers 610*a-n* electrically coupled to one more antennas 616*a-n* for communicating with wireless devices, such as, for example, the mobile devices 108, 118, 128, or 500 of FIGS. 1 and 5, respectively. The each of the transceivers 610*a*-610*n* may include a respective transmitter 612*a-n* for sending signals (e.g., downlink messages) and a respective receiver 614*a-n* for receiving signals (e.g., uplink messages). The node 600 may also include a network interface 620 to communicate with other network nodes (e.g., sending and receiving queries and responses). For example, each network element may be configured to communicate (e.g., wired or wireless backhaul communication) with a gateway, or other suitable device of a network, to facilitate communication with one or more core network nodes (e.g., any of the other access points shown in FIG. 1, the server 110, and/or other network devices or nodes). Additionally and/or alternatively, communication with other network nodes may also be performed using the transceivers 610*a-n* and/or the respective antennas 616*a-n*.

The node 600 may also include other components that may be used with embodiments described herein. For example, the node 600 may include, in some embodiments, a controller 630 (which may be similar to the processor 510 of FIG. 5) to manage communications with other nodes (e.g., sending and receiving messages) and to provide other related functionality. For example, the controller 630 may be configured to control the operation of the antennas 616*a-n* so as to adjustably control the antennas' transmission power and phase, gain pattern, antenna direction (e.g., the direction at which a resultant radiation beam from the antennas 616*a-n* propagates), antenna diversity, and other adjustable antenna parameters for the antennas 616*a-n* of the node 600. In some embodiments, the antennas' configuration may be controlled according to pre-stored configuration data provided at the time of manufacture or deployment of the node 600, or according to data obtain from a remote device (such as a central server sending data representative of the antenna configuration, and other operational parameters, that are to be used for the node 600).

In some embodiments, the node 600 may also be configured (e.g., through operations performed on the controller 630) to divide/partition data into data blocks, include in any one data block data portions from one or more other blocks, derive validation code(s), and communicate the data blocks and validation code(s) to a remote device (which may be part of the same network, such as a peer-to-peer network, as the originating node 600). The node 600 may further be configured to receive data blocks from a remote originating device, receive validation code(s) relating to the received data blocks, reconstruct the original data from the received blocks, and perform data verification based, at least in part, on the received validation code(s).

In addition, the node 600 may include, in some embodiments, neighbor relations controllers (e.g., neighbor discovery modules) 640 to manage neighbor relations (e.g., maintaining a neighbor list 642) and to provide other related functionality. The controller 630 may be implemented, in some embodiments, as a processor-based device, with a configuration and functionality similar to that shown and described in relation to FIG. 7. In some embodiments, the node may also include one or more sensors (not shown), such as any of the one or more sensors 512 of the wireless device 500 depicted in FIG. 5.

Figure 7:
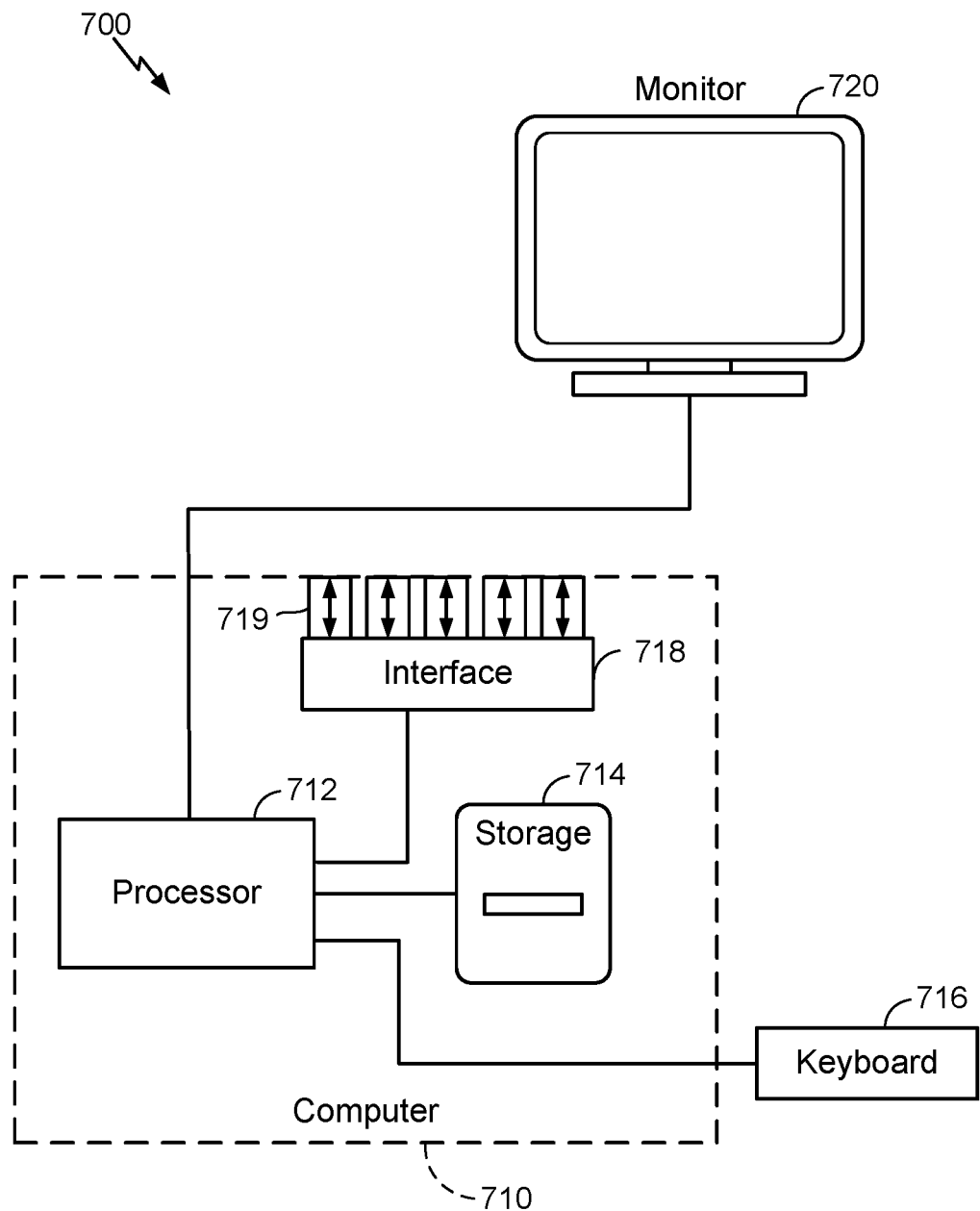
FIG. 7 is a schematic diagram of an example computing system.

Performing the procedures described herein may also be facilitated by a processor-based computing system. With reference to FIG. 7, a schematic diagram of an example computing system 700 is shown. The computing system 700 may be housed in, for example, a wireless device such as the devices 108, 118, 128, and 500 of FIGS. 1 and 5, and/or may comprise at least part of, or all of, wireless devices, servers, nodes, access points, or base stations, such as the nodes 104a-b, 106a-c, 110, and 600 depicted in FIGS. 1 and 6. The computing system 700 includes a computing-based device 710 such as a personal computer, a specialized computing device, a controller, and so forth, that typically includes a central processor unit (CPU) 712. In addition to the CPU 712, the system includes main memory, cache memory and bus interface circuits (not shown). The computing-based device 710 may include a mass storage device 714, such as a hard drive and/or a flash drive associated with the computer system. The computing system 700 may further include a keyboard, or keypad, 716, and a monitor 720, e.g., a CRT (cathode ray tube), LCD (liquid crystal display) monitor, etc., that may be placed where a user can access them (e.g., a mobile device's screen).

The computing-based device 710 is configured to facilitate, for example, the implementation of one or more of the procedures described herein, including the procedures to divide data into data blocks, generate resultant data blocks (padded with data portions from others of the data blocks), generate validation codes, communicate the data blocks and validation codes to remote device, receive data blocks and validation codes from another device, and reconstruct the data sent from the other device, and perform validation on the received data blocks. The mass storage device 714 may thus include a computer program product that, when executed on the computing-based device 710, causes the computing-based device to perform operations to facilitate the implementation of the procedures described herein, as well as procedures to control the general functionality of the computing-based device 710, and procedures to implement other applications and operations. The computing-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 7, the computing-based device 710 may include an interface 718 with one or more interfacing circuits (e.g., a wireless port that include transceiver circuitry, a network port with circuitry to interface with one or more network devices, etc.) to provide/implement communication with remote devices (e.g., so that a wireless device, such as any of the wireless devices or nodes depicted in any of the figures, could communicate, via a port, such as the port 719, with another device or node). Alternatively and/or additionally, in some embodiments, special purpose logic circuitry, e.g., an FPGA (field programmable gate array), a DSP processor, an ASIC (application-specific integrated circuit), or other types of circuit-based and hardware arrangements may be used in the implementation of the computing system 700. Other modules that may be included with the computing-based device 710 are speakers, a sound card, a pointing device, e.g., a mouse or a trackball, by which the user can provide input to the computing system 700. The computing-based device 710 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 710 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically (e.g., with lasers). Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) may refer to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

The detailed description set forth above in connection with the appended drawings is provided to enable a person skilled in the art to make or use the disclosure. It is contemplated that various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Although particular embodiments have been disclosed herein in detail, this has been done by way of example for purposes of illustration only, and is not intended to be limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for data communication, the method comprising:
    dividing original data into multiple data blocks;
    for each of the multiple data blocks, including a portion of a respective at least one other of the multiple data blocks to produce multiple corresponding resultant data blocks, wherein the portion from the respective at least one other of the multiple data blocks included in the each of the multiple data blocks indicates an order of the multiple data blocks in the original data;
    generating at least one validation code based on the multiple corresponding resultant data blocks; and
    communicating to a remote device, using multiple data frames transmitted over discrete multiple time intervals, at least the multiple corresponding resultant data blocks and the at least one validation code, wherein the multiple corresponding resultant data blocks in the multiple data frames are used to reconstruct the original data at the remote device according to the respective portion included in the each of the multiple data blocks from the respective at least one other of the multiple data blocks that indicate the order of the multiple data blocks in the original data.

2. The method of claim 1, wherein including, for the each of the multiple data blocks, the portion of the respective at least one other of the multiple data blocks to produce the multiple corresponding resultant data blocks comprises:
    appending to a respective beginning part of an $i^{th}$ block, $D_i$, of N data blocks, an end portion of an $(i+1)^{th}$ data block, $D_{i+1}$; and
    appending to a respective end part of the $i^{th}$ block, $D_i$, a beginning portion of an $(i-1)^{th}$ data block, $D_{i-1}$.

3. The method of claim 2, further comprising:
    appending to an end part of a first block, $D_1$, of the N data blocks, a beginning portion of an $N^{th}$ block, $D_N$; and
    appending to a beginning part of the first data block, $D_1$, an end portion of a second block $D_2$.

4. The method of claim 1, wherein generating the at least one validation code comprises:
    generating a validation code for each of the multiple corresponding resultant data blocks to generate multiple corresponding validation codes for the multiple corresponding resultant data blocks.

5. The method of claim 4, wherein generating the validation code for the each of the multiple corresponding resultant data blocks comprises:
    applying a validation function to the each of the multiple corresponding resultant data blocks to generate the multiple corresponding validation codes.

6. The method of claim 4, further comprising:
    combining at least some of the multiple corresponding validation codes to generate a combined validation code;
    applying a validation function to the combined validation code to generate a resulting validation code; and
    communicating to the remote device at least the resulting validation code.

7. The method of claim 6, wherein combining the at least some of the multiple corresponding validation codes to generate the combined validation code comprises:
    performing one or more of a concatenation operation, a binary operation, or a logical operation on the at least some of the multiple corresponding validation codes to generate the combined validation code.

8. The method of claim 5, wherein the validation function comprises a hash function.

9. The method of claim 1, wherein communicating to the remote device the at least the multiple corresponding resultant data blocks and the at least one validation code comprises:

communicating to the remote device the multiple data frames, each of the multiple data frames comprising at least one of the multiple corresponding resultant data blocks and at least one validation code corresponding to another one of the multiple resultant data blocks.

10. A computing device comprising:
one or more processors configured to:
divide data into multiple data blocks;
for each of the multiple data blocks, include a portion of a respective at least one other of the multiple data blocks to produce multiple corresponding resultant data blocks, wherein the portion from the respective at least one other of the multiple data blocks included in the each of the multiple data blocks indicates an order of the multiple data blocks in the original data; and
generate at least one validation code based on the multiple corresponding resultant data blocks; and
a transceiver, coupled to the one or more processors, configured to:
communicate to a remote device, using multiple data frames transmitted over discrete multiple time intervals, at least the multiple corresponding resultant data blocks and the at least one validation code, wherein the multiple corresponding resultant data blocks in the multiple data frames are used to reconstruct the original data at the remote device according to the respective portion included in the each of the multiple data blocks from the respective at least one other of the multiple data blocks that indicate the order of the multiple data blocks in the original data.

11. The computing device of claim 10, wherein the one or more processors configured to include, for the each of the multiple data blocks, the portion of the respective at least one other of the multiple data blocks to produce the multiple corresponding resultant data blocks are configured to:
append to a respective beginning part of an $i^{th}$ block, $D_i$, of N data blocks, an end portion of an $(i+1)^{th}$ data block, $D_{i+1}$; and
append to a respective end part of the $i^{th}$ block, $D_i$, a beginning portion of an $(i-1)^{th}$ data block, $D_{i-1}$.

12. The computing device of claim 11, wherein the one or more processors are further configured to:
append to an end part of a first block, $D_1$, of the N data blocks, a beginning portion of an $N^{th}$ block, $D_N$; and
append to a beginning part of the first data block, $D_1$, an end portion of a second block $D_2$.

13. The computing device of claim 10, wherein the one or more processors configured to generate the at least one validation code are configured to:
generate a validation code for each of the multiple corresponding resultant data blocks to generate multiple corresponding validation codes for the multiple corresponding resultant data blocks.

14. The computing device of claim 13, wherein the one or more processors configured to generate the validation code for the each of the multiple corresponding resultant data blocks are configured to:
apply a validation function to the each of the multiple corresponding resultant data blocks to generate the multiple corresponding validation codes.

15. The computing device of claim 13, wherein the one or more processors are further configured to:

combine at least some of the multiple corresponding validation codes to generate a combined validation code;
apply a validation function to the combined validation code to generate a resulting validation code; and
communicate to the remote device at least the resulting validation code.

16. The computing device of claim 15, wherein the one or more processors configured to combine the at least some of the multiple corresponding validation codes to generate the combined validation code are configured to:
perform one or more of a concatenation operation, a binary operation, or a logical operation on the at least some of the multiple corresponding validation codes to generate the combined validation code.

17. The computing device of claim 14, wherein the validation function comprises a hash function.

18. The computing device of claim 10, wherein the one or more processors configured to communicate to the remote device the at least the multiple corresponding resultant data blocks and the at least one validation code are configured to:
communicate to the remote device the multiple data frame, each of the multiple data frames comprising at least one of the multiple corresponding resultant data blocks and at least one validation code corresponding to another one of the multiple resultant data blocks.

19. An apparatus comprising:
means for dividing data into multiple data blocks;
means for including, for each of the multiple data blocks, a portion of a respective at least one other of the multiple data blocks to produce multiple corresponding resultant data blocks, wherein the portion from the respective at least one other of the multiple data blocks included in the each of the multiple data blocks indicates an order of the multiple data blocks in the original data;
means for generating at least one validation code based on the multiple corresponding resultant data blocks; and
means for communicating to a remote device, using multiple data frames transmitted over discrete multiple time intervals, at least the multiple corresponding resultant data blocks and the at least one validation code, wherein the multiple corresponding resultant data blocks in the multiple data frames are used to reconstruct the original data at the remote device according to the respective portion included in the each of the multiple data blocks from the respective at least one other of the multiple data blocks that indicate the order of the multiple data blocks in the original data.

20. The apparatus of claim 19, wherein the means for including, for the each of the multiple data blocks, the portion of the respective at least one other of the multiple data blocks to produce the multiple corresponding resultant data blocks comprises:
means for appending to a respective beginning part of an $i^{th}$ block, $D_i$, of N data blocks, an end portion of an $(i+1)^{th}$ data block, $D_{i+1}$; and
means for appending to a respective end part of the $i^{th}$ block, $D_i$, a beginning portion of an $(i-1)^{th}$ data block, $D_{i-1}$.

21. The apparatus of claim 20, further comprising:
means for appending to an end part of a first block, $D_1$, of the N data blocks, a beginning portion of an $N^{th}$ block, $D_N$; and
means appending to a beginning part of the first data block, $D_1$, an end portion of a second block $D_2$.

22. The apparatus of claim 19, wherein the means for generating the at least one validation code comprises:
   means for generating a validation code for each of the multiple corresponding resultant data blocks to generate multiple corresponding validation codes for the multiple corresponding resultant data blocks.

23. The apparatus of claim 22, further comprising:
   means for combining at least some of the multiple corresponding validation codes to generate a combined validation code;
   means for applying a validation function to the combined validation code to generate a resulting validation code; and
   means for communicating to the remote device at least the resulting validation code.

24. A non-transitory computer readable media programmed with instructions, executable on a processor, to:
   divide data into multiple data blocks;
   for each of the multiple data blocks, include a portion of a respective at least one other of the multiple data blocks to produce multiple corresponding resultant data blocks, wherein the portion from the respective at least one other of the multiple data blocks included in the each of the multiple data blocks indicates an order of the multiple data blocks in the original data;
   generate at least one validation code based on the multiple corresponding resultant data blocks; and
   communicate to a remote device, using multiple data frames transmitted over discrete multiple time intervals, at least the multiple corresponding resultant data blocks and the at least one validation code, wherein the multiple corresponding resultant data blocks in the multiple data frames are used to reconstruct the original data at the remote device according to the respective portion included in the each of the multiple data blocks from the respective at least one other of the multiple data blocks that indicate the order of the multiple data blocks in the original data.

25. The computer readable media of claim 24, wherein the instructions to include, for the each of the multiple data blocks, the portion of the respective at least one other of the multiple data blocks to produce the multiple corresponding resultant data blocks comprise one or more instructions to:
   append to a respective beginning part of an $i^{th}$ block, $D_i$, of N data blocks, an end portion of an $(i+1)^{th}$ data block, $D_{i+1}$; and
   append to a respective end part of the $i^{th}$ block, $D_i$, a beginning portion of an $(i-1)^{th}$ data block, $D_{i-1}$.

26. The computer readable media of claim 25, comprising one or more further instructions to:
   append to an end part of a first block, $D_1$, of the N data blocks, a beginning portion of an $N^{th}$ block, $D_N$; and
   append to a beginning part of the first data block, $D_1$, an end portion of a second block $D_2$.

27. The computer readable media of claim 24, wherein the instructions to generate the at least one validation code comprise one or more instructions to:
   generate a validation code for each of the multiple corresponding resultant data blocks to generate multiple corresponding validation codes for the multiple corresponding resultant data blocks.

28. The computer readable media of claim 27, comprising one or more further instructions to:
   combine at least some of the multiple corresponding validation codes to generate a combined validation code;
   apply a validation function to the combined validation code to generate a resulting validation code; and
   communicate to the remote device at least the resulting validation code.

* * * * *